United States Patent
Ozkok et al.

(10) Patent No.: US 7,055,896 B2
(45) Date of Patent: Jun. 6, 2006

(54) ROOF BOX DEVICE AND ROOF MODULE WITH INTEGRATED ROOF BOX DEVICE

(75) Inventors: Kerim Ozkok, Unterschleissheim (DE); Michael Konig, Schwabisch Gmund (DE); Hans-Joachim Ludwig, Neckartenzlingen (DE)

(73) Assignee: Decoma (Germany) GmbH, Sulzbach (DE)

( * ) Notice: Subject to any disclaimer, the term of this patent is extended or adjusted under 35 U.S.C. 154(b) by 0 days.

(21) Appl. No.: 10/932,172

(22) Filed: Sep. 1, 2004

(65) Prior Publication Data

US 2005/0046240 A1   Mar. 3, 2005

(30) Foreign Application Priority Data

Sep. 1, 2003  (DE) ................. 103 40 746

(51) Int. Cl.
*B60J 7/00*   (2006.01)
(52) U.S. Cl. ............... 296/210; 296/211; 296/219
(58) Field of Classification Search ........... 296/210, 296/215, 37.7
See application file for complete search history.

(56) References Cited

U.S. PATENT DOCUMENTS

| | | | |
|---|---|---|---|
| 2,190,462 A * | 2/1940 | Votypka | 296/214 |
| 4,252,366 A * | 2/1981 | Rahm et al. | 296/222 |
| 4,830,428 A * | 5/1989 | Masuda et al. | 296/219 |
| 5,029,937 A * | 7/1991 | Yamamoto | 296/223 |
| 5,725,273 A * | 3/1998 | Vernon et al. | 296/37.7 |
| 5,986,203 A * | 11/1999 | Hanoka et al. | 136/251 |
| 6,189,960 B1 * | 2/2001 | Mumura et al. | 296/214 |
| 6,453,629 B1 * | 9/2002 | Nakazima et al. | 136/251 |
| 6,493,915 B1 * | 12/2002 | Zonneveld et al. | 29/401.1 |
| 6,530,621 B1 * | 3/2003 | Williams et al. | 296/219 |
| 6,550,852 B1 * | 4/2003 | Patz et al. | 296/211 |
| D483,317 S * | 12/2003 | Dowdey | D12/404 |
| 6,865,795 B1 * | 3/2005 | Hernandez et al. | 296/210 |

* cited by examiner

*Primary Examiner*—Kiran B. Patel
(74) *Attorney, Agent, or Firm*—Clark Hill PLC

(57) ABSTRACT

A roof module of a motor vehicle, wherein the roof module is manufactured from a plastic and a roof box device is integrally formed with the roof module in one piece.

14 Claims, 5 Drawing Sheets

ROOF BOX DEVICE AND ROOF MODULE WITH INTEGRATED ROOF BOX DEVICE

FIELD OF THE INVENTION

The invention relates to a roof module and roof box device for a roof module of a motor vehicle.

BACKGROUND OF THE INVENTION

So-called roof box devices that are fitted as an accessory to the roof of a motor vehicle and that considerably increase the available stowage volume in addition to the vehicle's normal luggage compartment have been known for a long time. As a rule, conventional roof box devices are attached to roof rack systems or are connected directly with the vehicle roof by means of attachment feet, claws or the like. As a result, conventional roof box devices are subject to the disadvantage that they can only be used either in conjunction with roof rack systems or that they must have complicated fixing devices to ensure reliable attachment while the vehicle is being driven during which time considerable forces, particularly in the form of wind load, act on the roof box device.

Furthermore, conventional roof box devices that are attached to a vehicle roof only allow access from outside whereby the lid of the roof box device is swung open or suchlike.

Accordingly, the underlying object of the invention is to specify a roof box device that has improved functionality and that can be manufactured particularly cost-effectively.

SUMMARY OF THE INVENTION

The roof module in accordance with the invention is designed for a motor vehicle and is manufactured preferably from a plastic wherein a roof box device is integrally formed with the roof module in one piece. Thus, the roof box device is integrated as part of the roof module and is a direct component of the roof module. Manufacture of the roof module from a plastic permits a great extent of freedom in the design or concrete configuration of the roof box device and, furthermore, offers the advantage of cost-effective, flexible and speedy production. In all cases the roof box device has an upper shell though the roof box device may optionally have a bottom shell as well.

In an advantageous embodiment, the roof box device may completely cover a length of the roof module although it may be formed to be located substantially centrally in the roof module over part of the width. Transparent structural elements may be set into the roof module contiguous with the roof box device arranged in the middle, for example to allow better incidence of daylight into the interior of the vehicle. Such transparent structural elements, subsequently referred to only as glass elements, are made favorably from a conventional laminated safety glass or a polycarbonate plastic, preferably with a scratch-proof hard coating which leads to further weight advantages for the roof module.

There are any number of possible variations with regard to the width and length of the roof box device as a component part of the roof module depending in each case on the stowage volume required for the roof box device and the manufacturer's design specifications. For example, it is possible to develop the roof box device so that in length it only extends over a rear part of the roof module, that is above the area of the back seats, while a transparent structural element is set into the front area of the roof module above the driver and passenger seats. As already explained, the plastic material used opens up a great extent of design freedom when configuring the roof module with the integrated roof box device.

In detail, the roof module may be configured substantially as a base frame within the inner area of which the roof box device is also formed as a strengthening element wherein glass elements or the like may be set in contiguous with the roof box device if necessary. Generally speaking, standard bonding of the glass elements with the plastic is appropriate in this case. Alternatively, the roof module may also be formed as a substantially flat plate with a roof box device designed to fit into it without the provision of separate recesses for setting in glass elements or the like. It is, therefore, no problem to satisfy diverse customer requirements in respect of individually matching up the vehicle roof.

The roof box device has an exceptionally high level of functionality in that it is accessible either from the outside of the vehicle and/or also from the interior of the vehicle by way of appropriate flap devices or the like, and in that it is no problem to gain access to the inside of the roof box device from the interior of the vehicle. In this case at least one hinged flap or at least one sliding element or the like is fitted to the roof box device so that the bottom shell and thus the roof box device can be opened in the direction of the vehicle's interior. The variability of the roof box device may be favorably increased in that, furthermore, at least one supporting element is provided between the top shell and the bottom shell in the form of an intermediate cover that is guided along the longitudinal sides of the roof box device. If the intermediate shelf extends along the entire length of the roof box device, it is possible for example, to store elongated and heavy objects underneath the intermediate shelf while smaller and lighter objects are placed on the intermediate shelf. This also applies vice versa wherein heavy objects may also be placed on the intermediate shelf and smaller and lighter objects may be placed under the intermediate shelf, i.e. above an upper side of the bottom shell.

The intermediate shelf includes either one structural element or it may include several individual elements. The ability to slide the intermediate shelf as a whole or to slide the individual elements together in the manner of a telescope offers any number of storage possibilities for various objects inside the roof box device. Thus, the intermediate shelf serves as a so-called floating roof liner. Alternatively, it is also possible to attach the bottom shell itself in such a way that it can slide relative to the roof box device. Thus, for example, access to the inside of the roof box device is allowed by correspondingly sliding the bottom shell in the direction longitudinal or transverse to the roof box device.

There are any number of storage possibilities on offer for various objects inside the roof box device thanks to the ability to slide the intermediate shelf in the direction longitudinal to the roof box device for example in the manner of a telescope wherein the intermediate shelf includes several individual elements.

The roof module in accordance with the invention may be manufactured preferably from a polyurethane (PUR) foam system, an injection molded thermoplastic or also from a glass mat thermoplastic (GMT) or sheet moulding compound (SMC) material. Thus, the roof box device may be integrated into the roof module in one piece by means of a suitable tool configuration. In this case for example, the top shell of the roof box device forms part of the outer surface of the roof module.

For a high-quality optical appearance of the vehicle it is generally desirable for the vehicle roof to have the same paintwork as the rest of the body parts. If the roof module is manufactured from a plastic, as is the case with the present invention, then at best the customer should not notice when looking at the vehicle that the roof module is manufactured from a plastic so as to rule out acceptance problems and the like with regard to plastic. In connection with this it is an advantageous refinement of the invention that the plastic used for manufacture of the roof module include a high-gloss film and a carrier material with which the high-gloss film is back-molded. In this case the high-gloss film has the same color as the other painted sheet-metal body parts so that there does not appear to be any visual difference between an outer surface of the roof module of plastic and the other body parts.

In an embodiment, the roof module on the outside of the vehicle may also be formed in a contrasting color to the rest of the vehicle's paintwork, e.g. in black. In conjunction with the manufacture of the roof module from a plastic in accordance with the invention, it must be emphasized that plastics in general lend themselves outstandingly to being dyed black by means of master batches.

In the case of the high-gloss film mentioned previously, this may be an extruded thermoplastic plastic film. An outer surface of the high-gloss film, which forms part of the outer surface of the vehicle, may be appropriately painted so that outwardly it is not possible to detect any difference between it and adjacent painted sheet-metal parts.

Alternatively, the high-gloss film in question may also be a co-extruded thermoplastic plastic film whereby the film consists of at least two layers of film. In this embodiment too, the high-gloss film in the form of the co-extruded film forms a part of the vehicle's outer surface. A suitable color pigmentation is worked into at least the layer of film that is contiguous with the vehicle's outer surface so that a color is produced that is preferably matched up to the paintwork of the painted sheet-metal parts adjacent to it.

As an alternative to dyeing the outer layer of the co-extruded film to match the color of the car, it is also possible to dye in a contrasting color such as black; in this case the vehicle is then correspondingly not painted black. In this connection it has been said that plastics lend themselves outstandingly well to being dyed black by means of so-called master batches. Thus, it is not generally necessary to carry out a separate painting step for a co-extruded high-gloss film such as this. Nevertheless, if necessary the co-extruded high-gloss film may be subjected to such painting in order to achieve an even more accurate color match with the rest of the vehicle's paintwork.

In the manufacture of the roof module, the high-gloss film is thermoformed or injection molded with the carrier material prior to back-moulding or back-filling, preferably in a shape that corresponds to the later dimensions of the completed roof module. Alternatively, the high-gloss film may also be manufactured from a duromer moulding compound, by rotational moulding for example. In an initial step, when the high-gloss film is substantially ready, it is back-molded or back-filled with the carrier material on the side opposite to that of the gloss layer wherein the carrier material adds the mechanical properties required to the roof module thus produced. For example, a polyurethane system, a thermoplastic material or a GMT or SMC material may be used as carrier material which is foamed, injection molded or stamped to the back of the high-gloss film.

The method of manufacture explained for the roof module with a roof box device in accordance with the invention is just as suitable for a roof module in which a roof box device is not formed to be directly integrated but where merely a recess is formed, wherein the recess is in turn suitable for holding of at least one functional roof component. In the same way, the roof box device can also be produced independently of the roof module by means of the manufacturing process explained, whereby a roof box device produced in such a manner is then inserted as a functional roof component into the recess of the roof module previously referred to.

When using the roof module in accordance with the invention for a motor vehicle, it is very advantageous from a production engineering point of view if the attachment point of the vehicle's roof area, which connection point is defined by a margin running around the roof rails, can always be selected to be the same. Accordingly, regardless of the embodiment of the roof module, there are no alterations necessary when getting the vehicle's sheet-metal body ready in which retaining areas are provided for fitting in the roof module, which has an extremely favorable effect on cost-effective production of the entire vehicle. Furthermore, with the roof module in accordance with the invention, it is possible to attach the roof module to the body using a so-called zero-tolerance joint so that the roof module finishes flush with the body or with the roof rails adjacent to it.

Deviating from this, the roof module in accordance with the invention may also be joined to a roof area of the vehicle's body in such a way that a gap is formed between the roof module and the body on the outside of the vehicle. In this case such a gap may be suitable to be covered by a decorative trim or the like so that the vehicle's appearance is not impaired.

Further advantages and configurations of the invention emerge from the description and the drawing attached.

It is understood that the features mentioned previously and those still to be explained in the following may be used not only in the combination specified in each case but also in other combinations or on their own without leaving the framework of the present invention.

BRIEF DESCRIPTION OF THE DRAWINGS

The invention is illustrated diagrammatically in the drawing on the basis of an embodiment and will be described in detail in the following with reference to the drawings.

DETAILED DESCRIPTION OF THE PREFERRED EMBODIMENTS

Figure 1:
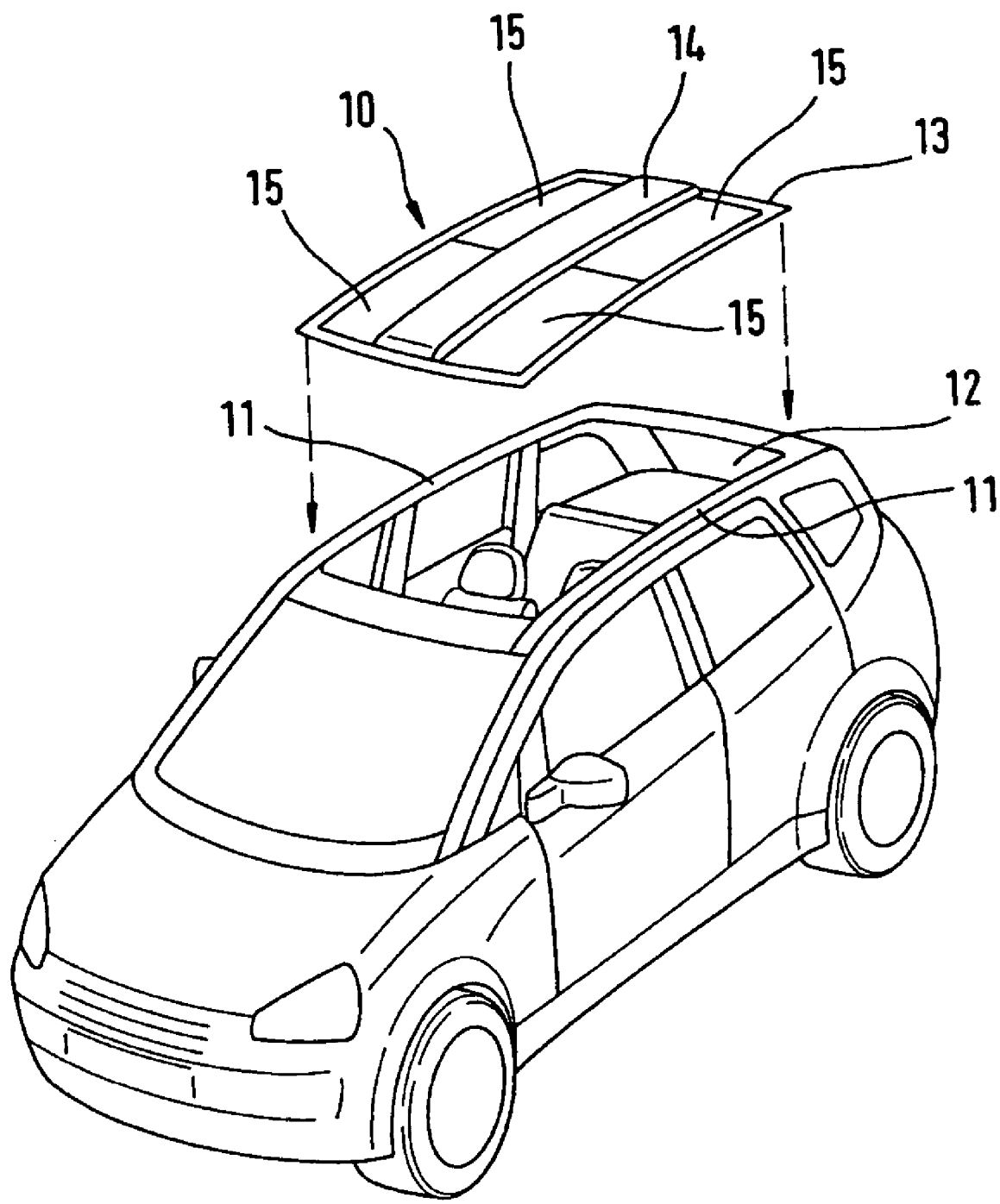
FIG. 1 shows the roof module in accordance with the invention in conjunction with a roof area of a motor vehicle adapted to it in an exploded view.

FIG. 1 shows an embodiment of the roof module 10 in accordance with the invention for assembly with a roof area of a motor vehicle. The vehicle's roof area includes roof rails 11 between which a corresponding opening 12 is formed, which is adapted to the dimensions of the roof module 10. If the roof module 10 is suitably connected to the roof rails 11, e.g. by bonding or the like, the roof module 10 completely covers the opening 12.

The roof module 10 has a frame 13 running around it that is preferably suitably bonded to roof rails 11. A roof box device 14 that covers the entire length of the roof module 10 is formed in the direction longitudinal to the roof module 10. In this case the roof box device 14 is designed to be integrated in the roof module 10 in one piece. If the roof box device 14 has a top shell 20 and a bottom shell 21 (see FIG. 5), the top shell 20 is preferably formed as a part of the outer surface of the roof module 10.

Adjacent to the roof box device 14, the roof module 10 has recesses into which four transparent structural elements 15 are set as shown in FIG. 1. A great deal of daylight can reach the interior of the vehicle from above through transparent structural elements 15. Structural elements 15 are preferably polycarbonate panes with a hard coating that ensures adequate scratch-proofing. Alternatively, the transparent structural elements may also be made of conventional laminated safety glass.

The roof box device 14 in accordance with the invention is designed so that it can be opened from both outside and inside, i.e. from the interior of the vehicle, or so that there is no problem with accessing it from the interior of the vehicle. The roof box device is explained in detail with reference to FIG. 5.

Figure 2:
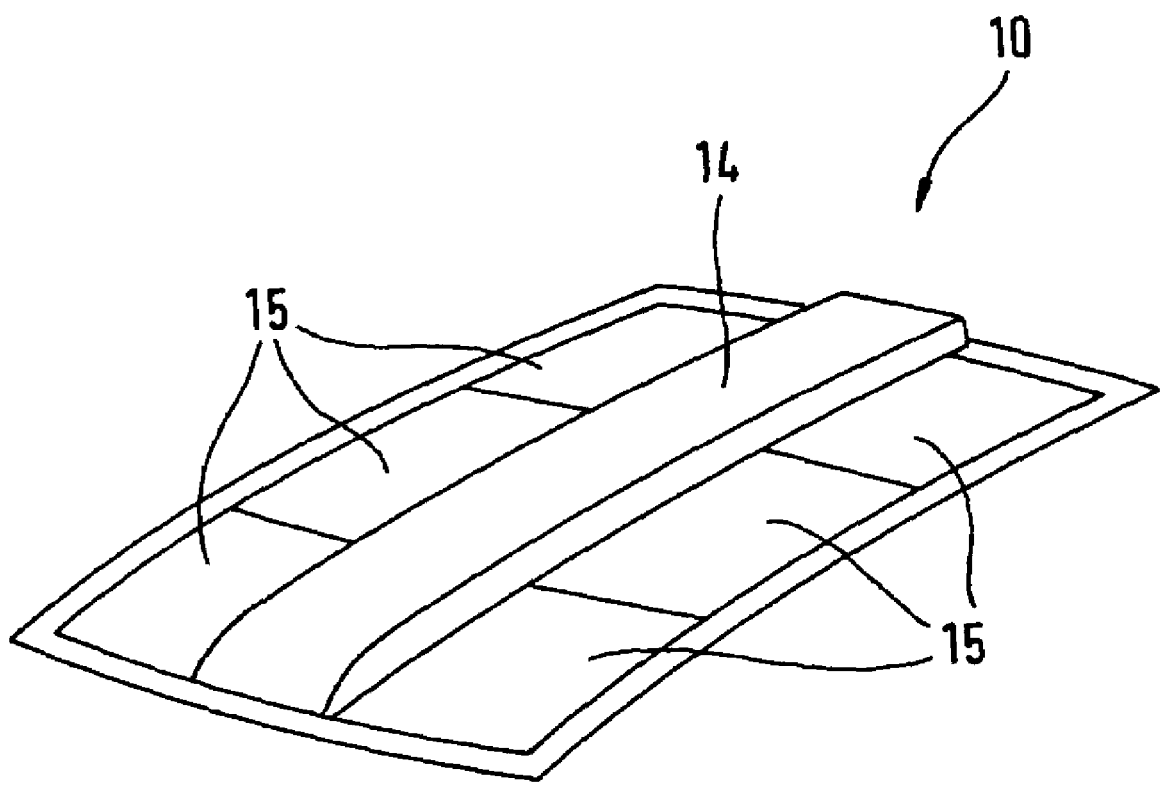
FIG. 2 shows the roof module in accordance with the invention in a simplified perspective view from above.

FIG. 2 shows a simplified perspective view of the roof module 10 in accordance with the invention in a further embodiment. In this case, a total of six glass elements 15 are set into corresponding recesses of the roof module adjacent to centrally arranged roof box device 14.

The top shell 20 may be formed in a known manner as a lid that is linked to a part of the frame of the roof box device 14 by means of conventional hinge elements or by means of plastic film hinges. Such film hinges can be manufactured more cost-effectively. One free end of the top shell 20 of the roof box device formed as a lid may be suitably locked in its closed position by means of snap fasteners, screw-type locks or the like.

The bottom shell 21 is formed to be open for example includes a web that serves as a storage surface stretching in the direction longitudinal to the roof module. As a result, free access is guaranteed from the interior of the vehicle to the storage surface of the web. This bottom shell 21 has transverse ribs and raised longitudinal edges to prevent objects from shifting undesirably or even from falling off the web's surface.

Figure 3:
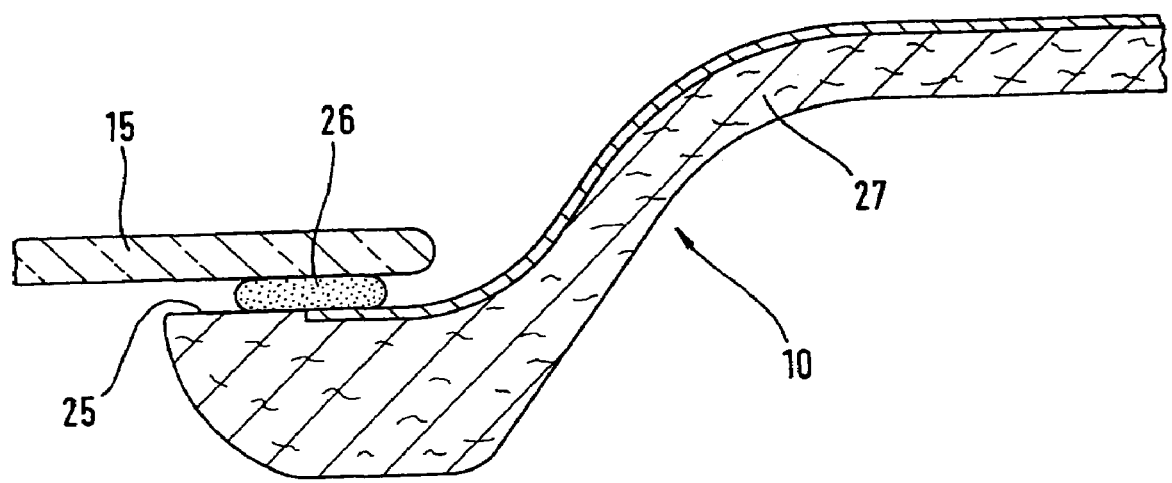
FIG. 3 shows a lateral cross-sectional view of a partial section of the roof module in accordance with the invention with a transparent structural element set into it.

FIG. 3 shows a lateral cross-section of the roof module in an embodiment into which a glass element 15 is set as explained. On the margin of an appropriate recess the roof module has a seating surface 25; the outer contour of this surface is matched to the dimensions of glass element 15. A suitable adhesive 26 is applied to the marginal areas of the glass element 15 and respectively to the seating surface 25 so that the glass element 15 is reliably bonded to the seating surface 25 of the roof module 10. As shown by hatching 27 in FIG. 3, the roof module 10 is manufactured by using a PUR foam system that has fibre reinforcement in the preferred embodiment. As a result it is possible to achieve excellent mechanical properties for roof module 10 with simultaneous cost-effective production.

Figure 4:
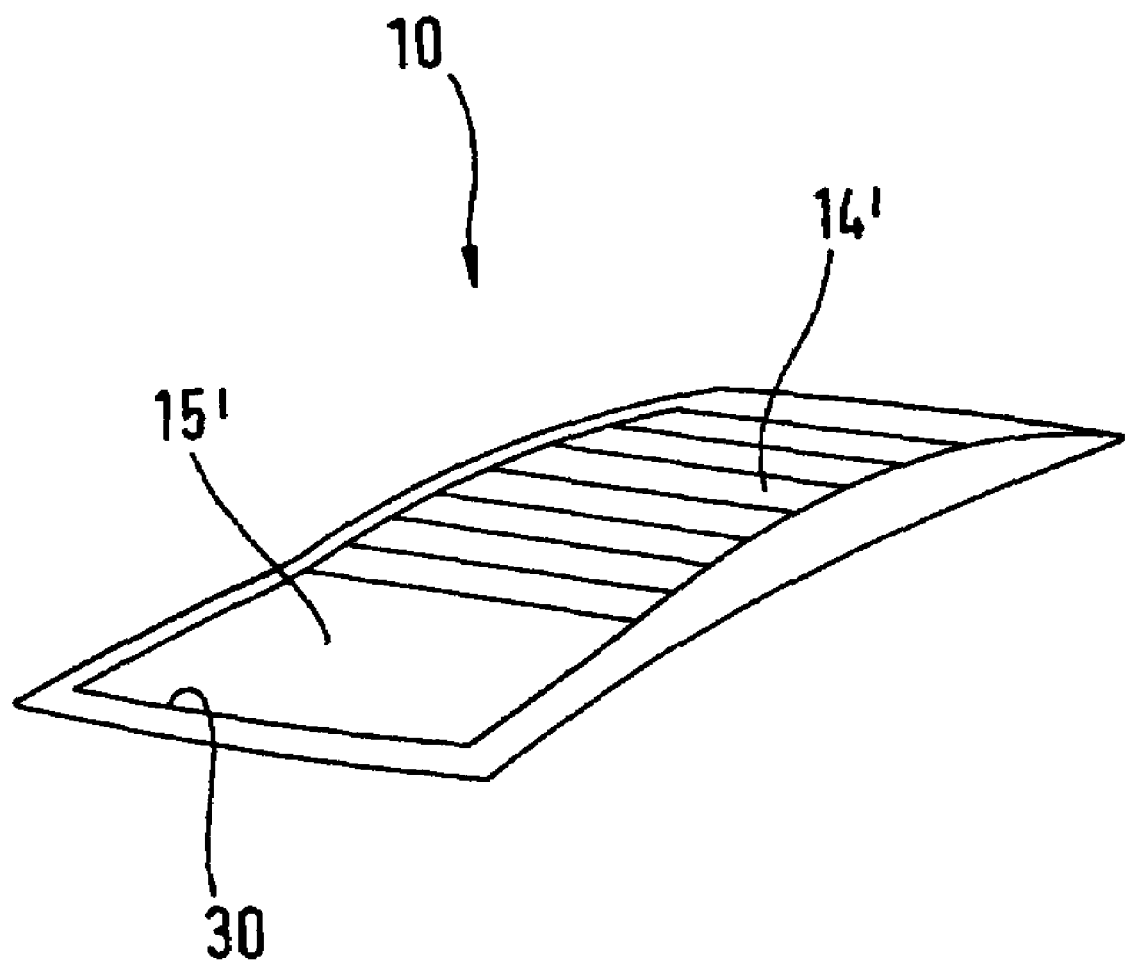
FIG. 4 shows the roof module in accordance with the invention in a further embodiment whereby a roof box device and a transparent structural element are retained in a recess of the roof module.

FIG. 4 shows a simplified perspective view of the roof module 10 in a further embodiment in which a central recess 30 is formed in a middle area of the roof module, which is enclosed by frame 13. In the embodiment shown here, the roof module 10 serves as a sort of adapter frame whereby recess 30 is suitable for holding at least one separate functional roof component. Such functional roof components may include for example, a roof box device, a slatted roof device, glass elements and the like. Recess 30 and frame 13 of the roof module 10 are adapted in an appropriate manner to any functional roof components resulting in a high level of design freedom with regard to manufacture of the vehicle roof. Thus, if one or more functional roof components are set into the recess 30 of the roof module 10, the roof module 10 in the form of the intermediate frame described and the functional roof component(s) set into it take over the function of a roof module as a complete system.

In the embodiment shown in FIG. 4, a roof box device 14' is held in a rear area of the roof module 10 that covers approximately half the length of the roof module. A glass element 15' is set into or bonded into the entire front half of recess 30, which brightens up the front area of the vehicle's interior over the driver and passenger seats with daylight from above.

In accordance with a further embodiment (not shown), at least one slatted roof device may be provided as a functional roof component. The slatted roof device may be opened or closed as desired since it is possible to slide the individual slats together.

Figure 5:
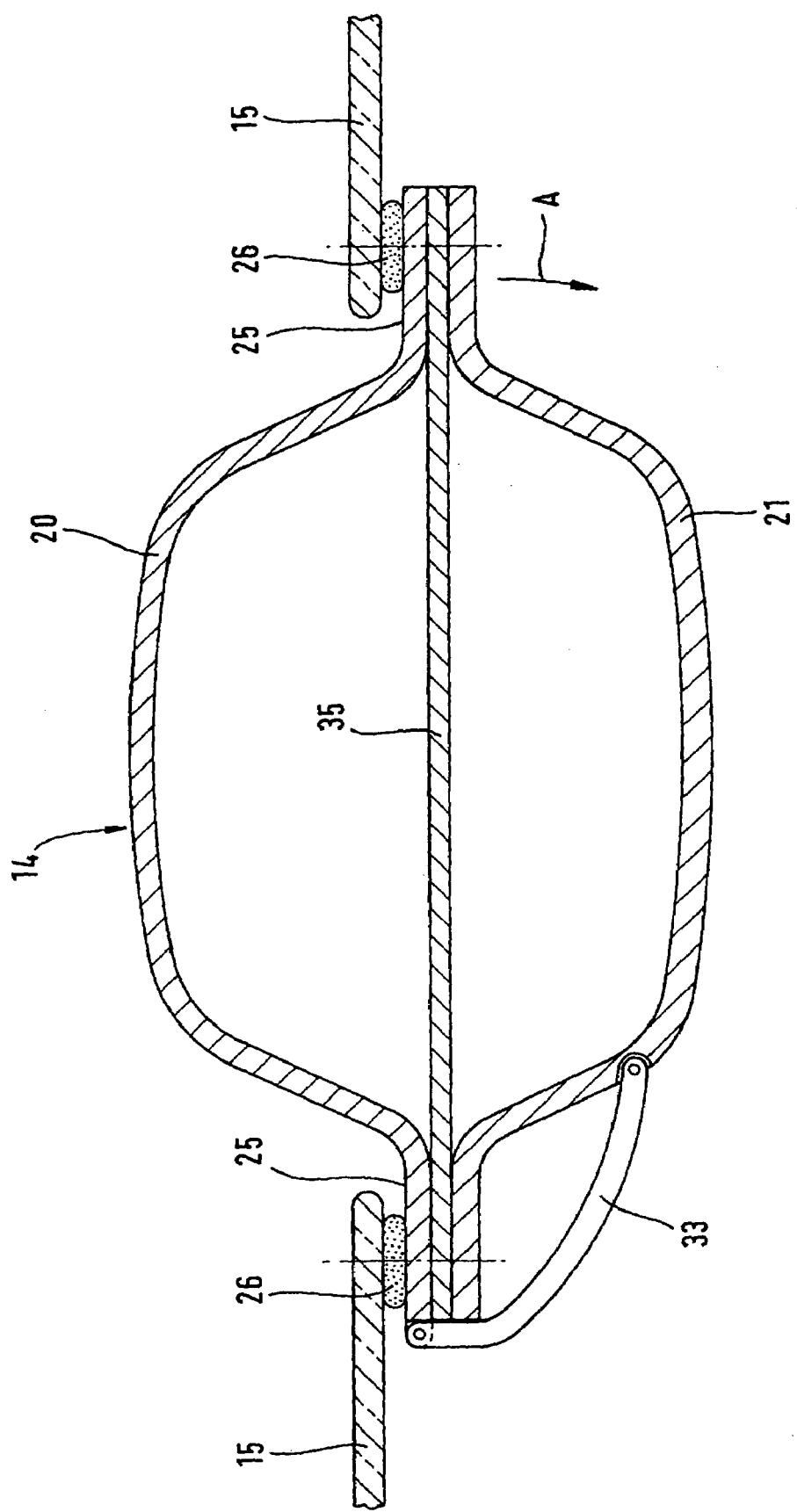
FIG. 5 shows the roof box device in accordance with the invention in a lateral cross-sectional view.

FIG. 5 shows a roof box device 14 in accordance with the invention in a lateral cross-section view. The embodiment shown here corresponds substantially to the roof box device 14 in FIG. 1. Glass elements 15 that are bonded in the marginal area to corresponding seating areas 25 using adhesive 26 are set into the roof module 10 adjacent to the centrally arranged roof box device 14.

The top shell 20 may, as previously explained, be swung open as a lid in the direction longitudinal to the roof module. It is no problem in a further embodiment (not shown) for the top shell to be installed in the roof module in such a way that it may be opened in a direction transverse to the roof module, i.e. for example may be lifted up in a direction transverse to the roof module or may be opened in another suitable manner.

Furthermore, the bottom shell 21 is designed to be pivotable by means of a jointed device 33. If necessary, the bottom shell 21 may be pivoted downwards or opened in the direction of arrow A so that the user gains access to the stowage area of the roof box device 14.

In a further embodiment, the roof box device 14 optionally has a load-bearing element 35 that is arranged as an intermediate layer between the top shell 20 and the bottom shell 21. The load-bearing element 35 may be formed as a one-piece structural element. For greater variability of the stowage possibilities in the roof box device 14, the load-bearing element may also be multi-part wherein the individual parts advantageously may be slid together in the manner of a telescope in the direction transverse or longitudinal to the roof box device 14. For this purpose, the individual elements are suitably guided along their margins so that they slide between the top shell 20 and the bottom shell 21.

The above-described embodiments of the invention are intended to be examples of the present invention and numerous modifications, variations, and adaptations may be made to the particular embodiments of the invention without departing from the scope of the invention, which is defined in the claims.

What is claimed:

1. A roof module (10) for assembly with a roof area of a motor vehicle, said roof module (10) comprising:
a frame (13) defining exterior dimensions of said roof module (10);
a recess (30) enclosed by said frame (13) and which is suitable for holding at least one functional roof component (14', 15'), wherein at least one of said functional roof components is a roof box device (14') integrally formed with said roof module (10), said roof box device (14') having a top shell (20) and a bottom shell (21) whereby said roof box device (14') is accessible from inside the motor vehicle and wherein at least one of said functional roof module (10), said transparent structural element (15') disposed forward of said roof box device (14').

2. The roof module as set forth in claim 1 wherein said transparent structural element is made of a laminated safety glass or a polycarbonate material.

3. The roof module as set forth in claim 2 wherein said transparent structural element made of polycarbonate has a hard coating.

4. The roof module as set forth in claim 3 wherein said functional roof component is a slatted roof device.

5. The roof module as set forth in claim 4 wherein said roof module is a plastic made of a polyurethane foam system, an injection molded thermoplastic or a glass mat thermoplastic or sheet moulding compound material.

6. The roof module as set forth in claim 5 wherein said plastic is a high-gloss film having a carrier material backmolded thereto.

7. The roof module as set forth in claim 6 wherein said high-gloss film is thermoformed, injection molded or manufactured from a duromer.

8. The roof module as set forth in claim 7 wherein said high-gloss film is an extruded film.

9. The roof module as set forth in claim 7 wherein said high-gloss film is a co-extruded film.

10. The roof module as set forth in claim 7 wherein the outer side of said high-gloss film is painted or has color pigments worked into the for matching the color of the motor vehicle.

11. The roof module as set forth in claim 10 wherein said carrier material is made of a polyurethane system, a thermoplastic material or a glass mat thermoplastic or sheet molding compound material which is foamed, injected or stamped to the inner side of said high-gloss film.

12. The roof module as set forth in claim 11 wherein said roof module is fixedly secured to roof rails of the motor vehicle.

13. The roof module as set forth in claim 12 wherein said roof module (10) is fixedly secured to said roof rails by way of a zero-tolerance joint.

14. The roof module as set forth in claim 13 wherein said roof module is fixedly secured to the roof area of the motor vehicle such that a gap is formed between said roof module and the motor vehicle which is covered by a decorative trim.

* * * * *